(12) United States Patent
Molinero Horno et al.

(10) Patent No.: US 12,709,239 B2
(45) Date of Patent: Aug. 18, 2026

(54) JUNCTION BOX HAVING PARALLEL SWITCH FAILURE DETECTION

(71) Applicant: LEAR CORPORATION, Southfield, MI (US)

(72) Inventors: Ignacio Molinero Horno, Valls (ES); Miguel Cabezon Soriano, Valls (ES); Marc Miro Bargallo, Valls (ES)

(73) Assignee: LEAR CORPORATION, Southfield, MI (US)

( * ) Notice: Subject to any disclaimer, the term of this patent is extended or adjusted under 35 U.S.C. 154(b) by 337 days.

(21) Appl. No.: 18/450,579

(22) Filed: Aug. 16, 2023

(65) Prior Publication Data

US 2024/0072639 A1 Feb. 29, 2024

Related U.S. Application Data

(60) Provisional application No. 63/400,959, filed on Aug. 25, 2022.

(51) Int. Cl.
*B60R 16/03* (2006.01)

(52) U.S. Cl.
CPC .................................... *B60R 16/03* (2013.01)

(58) Field of Classification Search
CPC ...................................................... B60R 16/03
See application file for complete search history.

(56) References Cited

U.S. PATENT DOCUMENTS

| | | | | |
|---|---|---|---|---|
| 2017/0054290 | A1* | 2/2017 | Di | H02J 7/00 |
| 2018/0309299 | A1* | 10/2018 | Moriyama | G01R 31/00 |
| 2021/0247462 | A1* | 8/2021 | Ojha | G01R 19/16519 |
| 2022/0205919 | A1* | 6/2022 | Cohen | G06T 7/97 |
| 2022/0242269 | A1* | 8/2022 | Koolen | H02J 7/0013 |
| 2022/0302821 | A1* | 9/2022 | Saga | H02H 3/087 |
| 2023/0275421 | A1* | 8/2023 | Putnam | B60L 50/66<br>361/93.1 |
| 2025/0158383 | A1* | 5/2025 | Iseri | H03K 17/18 |

* cited by examiner

*Primary Examiner* — Lee E Rodak
*Assistant Examiner* — Zannatul Ferdous
(74) *Attorney, Agent, or Firm* — Alston & Bird LLP

(57) ABSTRACT

A junction box comprises parallel-connected switches comprising at least a first switch and a second switch. A first current sensor senses current through the first switch. A second current sensor senses current through the second switch. A controller is in communication with the first and second current sensors. The controller modifies operation of the junction box in response to detecting at least one of the switches is failed. The controller detects that one of the first switch and the second switch is failed when the current through the first switch and the current through the second switch are unbalanced.

20 Claims, 2 Drawing Sheets

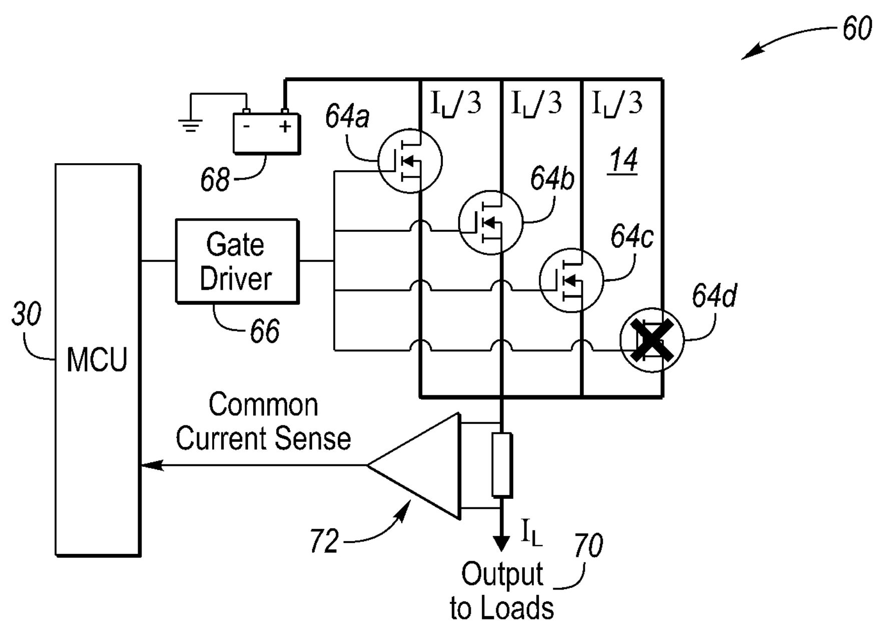
FIG. 2A
*(CONVENTIONAL)*

JUNCTION BOX HAVING PARALLEL SWITCH FAILURE DETECTION

CROSS-REFERENCE TO RELATED APPLICATIONS

This application claims the benefit of U.S. Provisional Application No. 63/400,959, filed Aug. 25, 2022, the disclosure of which is hereby incorporated in its entirety by reference herein.

TECHNICAL FIELD

The present disclosure relates to power distribution units such as in the form of junction boxes.

BRIEF DESCRIPTION OF THE DRAWINGS

FIG. 2A illustrates a schematic diagram of a junction box in accordance with the state of the art.

DETAILED DESCRIPTION

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In vehicles, junction boxes are used to distribute electrical power between a power source and one or more loads. For instance, a junction box is a main hub in a vehicle's electrical system, controlling and providing electrical power to various electrical features such as power windows, power door locks, lighting (interior and exterior), instrumentation, and the audio system.

Some junction boxes comprise power switches for controllably distributing power. The power switches of solid-state junction boxes are formed by one or more silicon switches (e.g., MOSFETs, IGBTs, etc.).

Figure 1:
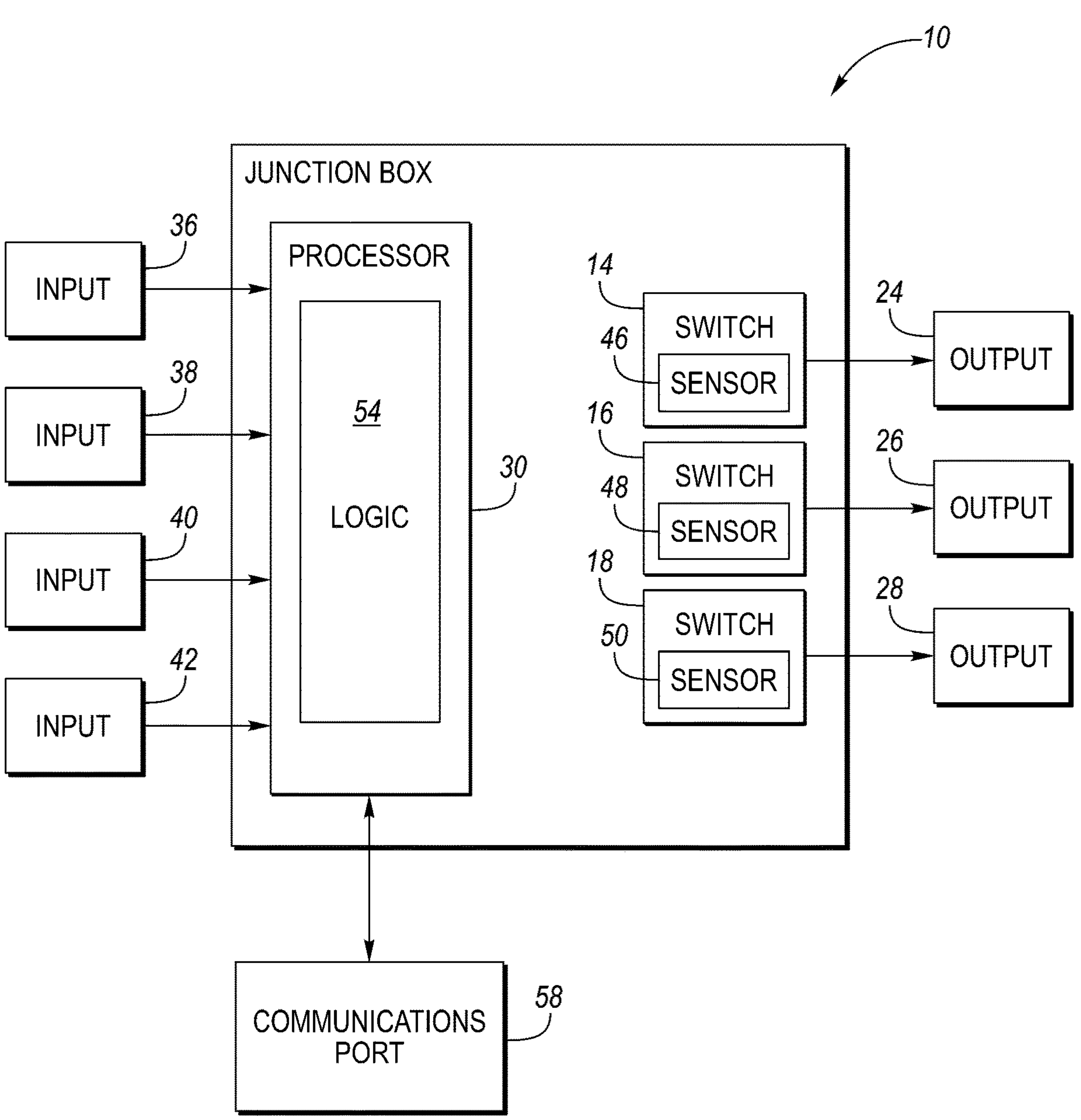
FIG. 1 illustrates a junction box in accordance with an embodiment of the present disclosure.

Referring now to FIG. 1, a junction box 10 in accordance with an embodiment of the present disclosure is shown. Junction box 10 comprises a plurality of power switches 14, 16, and 18 to provide electrical power distribution to a plurality of outputs (i.e., loads) 24, 26, and 28. Processor 30 (e.g., a controller of junction box 10) controls the opening and closing of power switches 14, 16, and 18 as a function of, for example, command and/or sensor signals received from inputs 36, 38, 40, and 42 thereto.

Electrical current flows from a power source to a load through a power switch connected between the power source and the load when the power switch is closed. Conversely, no electrical current flows from the power source to the load through the power switch when the power switch is opened.

Junction box 10 includes any number of power switches 14, 16, and 18 and features for controlling electrical power transmissions to loads 24, 26, and 28. Likewise, junction box 10 includes any number of features and configurations for manipulating or otherwise reconfiguring the electrical signals in communication therewith.

Junction box 10 operates in any number of environments and supports any number of operations. Junction box 10, referrable to as a power distribution unit (PDU), is of the type commonly found in automobiles and other vehicles where multiple power distribution wires and connectors connect to the junction box outputs to receive electrical power from one or more power sources (e.g., one or more batteries) (not shown) connected to junction box 10. For example, various vehicle control features are in communication with inputs 36, 38, 40, and 42 to request electrical power distribution to outputs 24, 26, and 28 such that processor 30 receives the input requests and performs any number of operations to distribute the requested electrical power to the associated loads 24, 26, and 28, i.e., by closing power switches 14, 16, and 18 associated with the loads. That is, power switch 14 is closed to distribute power to load 24, power switch 16 is closed to distribute power to load 26, and power switch 18 is closed to distribute power to load 28.

Of course, the present disclosure contemplates any number of configurations and features for junction box 10 and is not intended to be limited to the foregoing. The present disclosure contemplates the use of junction box 10 in any number of locations, environment, and applications and is not intended to be limited to the foregoing.

Power switches 14, 16, and 18 include any number of configurations and features to support the transmission of electrical power to loads 24, 26, and 28.

In this embodiment, power switches 14, 16, and 18 include sensors 46, 48, and 50, processors (not shown), logic (not shown), or other features to support the operation thereof. These features may be packaged within an integrated circuit and mounted on a printed circuit board, such as to provide an integrated circuit having a dual-in-line package (DIP).

Power switches 14, 16, and 18 may be characterized as relay-less and fuse-less devices in that they provide functionality associated with relays and fuses. That is, power switches 14, 16, and 18 are opened and closed to control distribution of electrical power to outputs (i.e., to provide relay functionality) and the power switches are opened during a fault condition to prevent the distribution of electrical power to outputs (i.e., to provide fuse functionality).

Power switches 14, 16, and 18 are solid-state devices having one or more silicon switches (e.g., MOSFETs, IGBTs, etc.). Power switches 14, 16, and 18 are referrable to as smart devices in that they are controllable with control signals emitted from processor 30 or based on other logical entities in communication therewith.

Sensors 46, 48, and 50 monitor any number of operating conditions associated with power switches 14, 16, and 18, such as current flow and voltage and switch temperature levels. Particularly, as described herein, sensors 46, 48, and 50 provide current sensing of electrical power current outputted through power switches 14, 16, and 18 to loads 24, 26, and 28.

Processor 30 communicates with power switches 14, 16, and 18 and with sensors 46, 48, and 50 through a number of communication lines. Power switches 14, 16, and 18 and sensors 46, 48, and 50 communicate with processor 30 through a common communication bus (not shown) or other multiple access communication medium.

Processor 30 includes logic 54 to control its operation and the operation of power switches 14, 16, and 18. Logic 54 specifies any number of operating and control applications. Logic 54 includes features to control the opening and closing of power switches 14, 16, and 18 so as to control the electrical power distribution to loads 24, 26, and 28. In this embodiment, power switches 14, 16, and 18 include registers or other features which provide hard-wired logic or other features to support or backup operations associated with opening and closing power switches 14, 16, and 18, such as to provide fault protection and switch opening in the event of failure of processor 30 or logic 54 (i.e., to protect against the loads experiencing over-current or over-voltage conditions).

Junction box 10 includes a communications port 58 to communicate with processor 30. Communications port 58 is useable by external devices to program processor 30 and to receive information therefrom. The present disclosure contemplates processor 30 including logic 54 in conjunction with sensors 46, 48, and 50 to diagnose fault conditions in power switches 14, 16, and 18 such that the fault conditions are communicated to a computer or other individual through communications port 58, such as to facilitate vehicle repair and troubleshooting.

The opening of power switches 14, 16, and 18 is controlled by processor 30 so as to meter the amount of current flowing therethrough to outputs 24, 26, and 28. In this embodiment, processor 30 controls a voltage level and/or other operating parameter of power switches 14, 16, and 18 to control the opening of the power switches.

Processor 30 controls the opening and closing of power switches 14, 16, and 18 to provide reusable fuse operations. This is advantageous during fault conditions in that power switches 14, 16, and 18 are opened during the fault condition to protect against damage and thereafter closed by processor 30 after the error has been corrected.

In this embodiment, processor 30 includes logic 54 for monitoring the operating conditions attendant with the fault conditions so as to provide feedback useable to diagnosis error states. Processor 30, for example, assigns diagnosis codes as a function of various fault conditions. Processor 30 then outputs the diagnosis codes through communications port 58 for external analysis.

The diagnosis codes include any number of parameters and are associated with any number of error detection triggers. For example, the diagnosis codes are associated with current related conditions, such as open conditions (no current flow), high current errors (i.e., different codes for varying current levels), shorts to ground, shorts to battery, and the like.

In accordance with embodiments of the present disclosure, one or more of power switches 14, 16, and 18 are comprised of a set of parallel-connected power switches (e.g., MOSFETs, IGBTs, etc.). As such, a junction box in accordance with embodiments of the present disclosure comprises at least one power switch and each of the at least one power switch comprises a set of parallel-connected power switches. For instance, in an embodiment, the junction box comprises a first power switch (e.g., power switch 14) and a second power switch (e.g., power switch 16), the first power switch comprises a first set of parallel-connected power switches, and the second power switch comprises a second set of parallel-connected power switches.

Referring now to FIG. 2A, with continual reference to FIG. 1, a schematic diagram of a junction box 60 in accordance with the state of the art is shown. Junction box 60 comprises power switch 14 which, in this example, is comprised of a set of power switches 64*a*, 64*b*, 64*c*, and 64*d* (i.e., junction box 60 comprises first power switch S1, second power switch S2, third power switch S3, and fourth power switch S4). Power switches 64*a*, 64*b*, 64*c*, and 64*d* are connected in parallel as shown in FIG. 2A.

Further, power switches 64*a*, 64*b*, 64*c*, and 64*d* are connected in parallel between an input power source 68 (i.e., a battery) and an output 70 to one or more power loads. In this regard, power switches 64*a*, 64*b*, 64*c*, and 64*d* are part of respective branches between battery 68 and output 70. For instance, first power switch 64*a* is a part of a first branch between power source 68 and output 70, second power switch 64*b* is a part of a second branch between power source 68 and output 70, etc.

Controller 30 (labeled as "MCU" in FIG. 2A as in "micro-controller") of junction box 60 is associated with a gate driver 66 to control the operation of power switches 64*a*, 64*b*, 64*c*, and 64*d*. For instance, when power switches 64*a*, 64*b*, 64*c*, and 64*d* are operating properly, controller 30 controls power switches 64*a*, 64*b*, 64*c*, and 64*d* to close to cause a current to flow from battery 68 to output 70 via each of the branches. Particularly, in this example with the number of parallel-connected power switches being four, following Kirchhoff s current law, the current flowing from battery 68 to output 70 via each of the four branches is $I_L/4$. That is, the current $I_L/4$ flows through each of the four power switches 64*a*, 64*b*, 64*c*, and 64*d* and their respective branches to output 70. As such, in this case with each of the four power switches 64*a*, 64*b*, 64*c*, and 64*d* being closed, the total current outputted from power switch 14 to load 70 is $I_L$ (i.e., $I_L/4++I_L/4+I_L/4=I_L$).

Junction box 60 further includes a common current sensor 72 (e.g., an amplifier with a shunt resistor). Common current sensor 72 is provided by sensor 46 associated with power switch 14. Common current sensor 72 senses the total current outputted from power switch 14 to load 70. In particular, the currents outputted by power switches 64*a*, 64*b*, 64*c*, and 64*d* are combined together to form a total current and common current sensor 72 senses this total current. For instance, when the total current outputted from power switch 14 to load 70 is $I_L$, such as in the case with each of the four power switches 64*a*, 64*b*, 64*c*, and 64*d* being closed, common current sensor 72 senses the total current as being $I_L$.

In operation, when a given one of power switches 64*a*, 64*b*, 64*c*, and 64*d* fails to close as commanded by controller 30 (and instead remains opened whereby the branch associated with the opened power switch is an opened circuit and no current can flow along this branch from battery 68 to output 70), the total current $I_L$ is shared among the remaining power switches. For instance, when power switch 64*d* fails to close (as indicated in FIG. 2A), following Kirchoff s current law, the current output through each of the remaining closed power switches 64*a*, 64*b*, and 64*c* increases from $I_L/4$ to $I_L/3$. In this way, even though power switch 64*d* is failed, the total current outputted from power switch 14 to load 70 remains $I_L$ (i.e., $I_L/3+I_L/3+I_L/3=I_L$).

Notably, even though power switch 64*d* failed and remains opened, common current sensor 72 senses the same total current output $I_L$. Accordingly, the failure of power switch 64*d* is not detectable by common current sensor 72. In sum, when one power switch (e.g., power switch 64*d*) fails, the current $I_L$ is shared among the remaining switches (e.g., power switches 64*a*, 64*b*, and 64*c*) and common current sensor 72 measures no difference in the current.

Figure 2B:
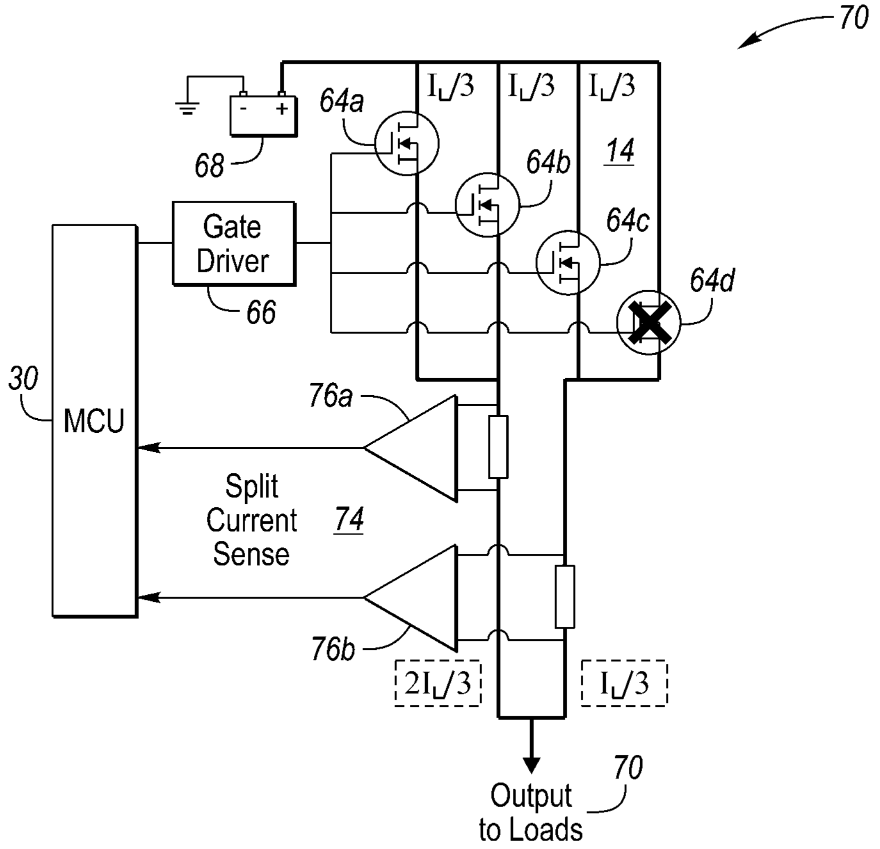
FIG. 2B illustrates a schematic diagram of a junction box in accordance with an embodiment of the present disclosure.

Referring now to FIG. 2B, with continual reference to FIGS. 1 and 2A, a junction box 70 in accordance with an embodiment of the present disclosure is shown. Junction box 70 differs from junction box 60 in that junction box 70 includes a split current sensor 74 whereas junction box 60 includes common current sensor 72.

Split current sensor 74 is provided by sensor 46 associated with power switch 14. Split current sensor 74 includes first and second current sensors 76*a* and 76*b* (each formed by a respective amplifier with a shunt resistor). First current sensor 76*a* senses the current outputted through power switches 64*a* and 64*b*. Second current sensor 76*b* senses the current outputted through power switches 64*c* and 64*d*. (In contrast, common current sensor 72 of junction box 60 senses the current outputted through all of power switches 64*a*, 64*b*, 64*c*, and 64*d*.)

Downstream of split current sensor 74 at output 70, the current outputted by power switches 64*a* and 64*b* and the current outputted by power switches 64*c* and 64*d* are combined together to form a total current.

When power switches 64*a*, 64*b*, 64*c*, and 64*d* are each operating properly to be closed with each power switch outputting the current $I_L/4$, first current sensor 76*a* measures the total output current $I_L/2$ of power switches 64*a* and 64*b* (i.e., $I_L/4+I_L/4=I_L/2$) and second current sensor 76*b* measures the total output current $I_L/2$ of power switches 64*c* and 64*d* (i.e., $I_L/4+I_L/4=I_L/2$).

When a power switch such as power switch 64*d* is failed and remains opened (as indicated in FIG. 2B) and, as described above, the current output of each of power switches 64*a*, 64*b*, and 64*c* is increased from $I_L/4$ to $I_L/3$, the current measurements of first and second current sensors 76*a* and 76*b* change. Particularly, first current sensor 76*a* measures the total output current $2I_L/3$ of power switches 64*a* and 64*b* (i.e., $I_L/3+I_L/3=2I_L/3$) and second current sensor 76*b* measures the total output current $I_L/3$ of power switches 64*c* and 64*d* (i.e., $I_L/3+0=I_L/3$, as the output current of power switch 64*d* is zero).

Accordingly, when a power switch such as power switch 64*d* is failed and remains opened, the fact that one of power switches 64*a*, 64*b*, 64*c*, and 64*d* is failed is detectable by split current sensor 74 as first and second current sensors 76*a* and 76*b* have different (i.e., unbalanced) current measurements (in this example, $2I_L/3 \neq I_L/3$). Conversely, when all of power switches 64*a*, 64*b*, 64*c*, and 64*d* are in proper order and closed, first and second current sensors 76*a* and 76*b* will have the same (i.e., balanced) current measurements (particularly, in this example, $I_L/2=I_L/2$).

Further, in the case of power switch 64*d* being failed and remaining opened, the fact that one of power switches 64*c* and 64*d* being failed is detectable by split current sensor 74 as second current sensor 76*b* has a smaller current measurement (in this example, $I_L/3$) than the current measurement of first current sensor 76*a* (in this example, $2I_L/3$).

In turn, controller 30 has the option to detect which of power switches 64*c* and 64*d* is failed. For instance, in response to the above exemplary unbalanced condition being detected, controller 30 alternately commands third and fourth power switches 64*c* and 64*d* to be opened. With fourth power switch 64*d* already being failed and opened, the total output current of power switches 64*c* and 64*d* detected by second current sensor 76*b* will be zero when third power switch 64*c* is commanded opened and the total output current of power switches 64*c* and 64*d* detected by second current sensor 76*b* will be $I_1/3$ when fourth power switch 64*d* is commanded opened. From a comparison of these current measurements, controller 30 readily discerns that fourth power switch 64*d* is failed.

In sum, when one power switch (e.g., power switch 64*d*) fails, the current $I_L$ is shared among the remaining power switches (e.g., power switches 64*a*, 64*b*, and 64*c*) and split current sensor 72 detects the current unbalance between the two groups of power switches (i.e., first group of power switches 64*a* and 64*b*, and second group of power switches 64*c* and 64*d*). The current unbalance is indicative of one of the power switches in the two groups being failed.

Controller 30 implements responding actions in response to detecting that a power switch has failed. For instance, controller 30 modifies operation of junction box 70 such as by shutting down or reducing operation (i.e., electrical output) of the junction box (such as by controlling the on-and-off duty cycles of one or more of the power switches) until the failed power switch has been remedied. Additionally, in embodiments, controller 30 generates warnings to notify of the failed power switch.

As described, a junction box in accordance with the present disclosure may employ split current sensing of a parallel set of power switches to detect current unbalance and thus a single power switch failure. For instance, in a power switch (e.g., 12V and 70 A or higher) designed as a parallel set of silicon switches (MOSFETs, IGBTs, etc.), the total current sense is split into at least two. Then, an unexpected unbalance of the current sensed signals a failure of one of the power switches (e.g., opened). With a minimum component increase (e.g., an additional amplifier/shunt resistor arrangement) it is possible to detect one component failure in a parallel-connected set of power switches (for three or more power switches).

The split current sensing arrangement in accordance with the present disclosure may improve on the use of a single current measurement or the use of one current measurement per each of the power switches.

Other benefits of the split current sensing arrangement in accordance with the present disclosure may include: a single stuck-open failure detection, needed for high ASIL (automotive safety integrity level) architectures (supply to ADAS (advanced driver-assistance system), etc.); cost effective solution towards sensing each of the branches (two current sensors instead of four current sensors); and other possible layouts (per 5, 6, . . . parallel drivers, the unbalance is always detected, or the number of split sense stages is increased).

Use of the split current sensing arrangement in accordance with the present disclosure may be with any power switch using a parallel set of silicon power switches (without current sense).

Item 1: In one embodiment, the present disclosure provides a junction box comprising a plurality of parallel-connected switches comprising at least a first switch and a second switch, a first current sensor sensing current through the first switch, a second current sensor sensing current through the second switch, and a controller in communication with the first and second current sensors, wherein the controller detects that one of the first switch and the second switch is failed when the current through the first switch and the current through the second switch are unbalanced.

Item 2: In another embodiment, the present disclosure provides the junction box of Item 1, wherein the controller detects that the first switch is failed when the current through the first switch is less than the current through the second switch.

Item 3: In another embodiment, the present disclosure provides the junction box of any preceding Item, wherein the controller detects that the first switch and the second switch are in a proper order when the current through the first switch and the current through the second switch are balanced.

Item 4: In another embodiment, the present disclosure provides the junction box of any preceding Item, wherein the plurality of parallel-connected switches further comprise a third switch and a fourth switch, the first current sensor sensing current through the first switch and the third switch, the second current sensor sensing current through the second switch and the fourth switch, and the controller detects that one of the first switch and the third switch or one of the second switch and the fourth switch is failed when the current through the first switch and the third switch and the current through the second switch and the fourth switch are unbalanced.

Item 5: In another embodiment, the present disclosure provides the junction box of Item 4, wherein the controller detects that one of the first switch and the third switch is failed when the current through the first switch and the third switch is less than the current through the second switch and the fourth switch.

Item 6: In another embodiment, the present disclosure provides the junction box of Item 5, wherein the controller detects that the first switch is failed when the current through the first switch and the third switch while the first switch is controlled by the controller to be opened is greater than the current through the first switch and the third switch while the third switch is controlled by the controller to be opened.

Item 7: In another embodiment, the present disclosure provides the junction box of Item 4, wherein the controller detects that the first switch, the second switch, the third switch, and the fourth switch are in a proper order when the current through the first switch and the third switch and the current through the second switch and the fourth switch are balanced.

Item 8: In another embodiment, the present disclosure provides the junction box of any preceding Item, wherein the plurality of parallel-connected switches comprise a first set of switches comprising the first switch and a second set of switches comprising the second switch, the first set of switches and the second set of switches comprising a same number of switches, the first current sensor sensing current through the first set of switches, the second current sensor sensing current through the second set of switches, and the controller detects that one of the switches of the first set of switches or one of the switches of the second set of switches is failed when the current through the first set of switches and the current through the second set of switches are unbalanced.

Item 9: In another embodiment, the present disclosure provides the junction box of Item 8, wherein the controller detects that one of the switches of the first set of switches is failed when the current through the first set of switches is less than the current through the second set of switches.

Item 10: In another embodiment, the present disclosure provides the junction box of any preceding Item, wherein the plurality of parallel-connected switches comprise a first set of switches comprising the first switch, a second set of switches comprising the second switch, and at least one or more set of switches, the first set of switches, the second set of switches, and each of the at least one or more set of switches comprising a same number of switches, the first current sensor sensing current through the first set of switches, the second current sensor sensing current through the second set of switches, at least one or more current sensors sensing current through the at least one or more set of switches, respectively, and the controller detects that one of the switches of the first set of switches, one of the switches of the second set of switches, or one of the switches of the at least one or more set of switches is failed when the current through the first set of switches, the current through the second set of switches, and the current through the at least one or more set of switches are unbalanced.

Item 11: In another embodiment, the present disclosure provides the junction box of any preceding Item, wherein the controller modifies operation of the junction box in response to detecting at least one of the switches is failed by modifying operation of one or more of the switches.

Item 12: In another embodiment, the present disclosure provides the junction box of any preceding Item, wherein the controller generates a warning notification in response to detecting at least one of the switches is failed.

Item 13: In another embodiment, the present disclosure provides the junction box of any preceding Item, wherein the plurality of parallel-connected switches are connected in parallel between a battery and a load.

Item 14: In another embodiment, the present disclosure provides the junction box of any preceding Item, wherein each of the current sensors comprises an amplifier and a shunt resistor.

Item 15: In another embodiment, the present disclosure provides a non-transitory computer readable storage medium comprising stored computer executable instructions to cause a controller to (i) sense, with a first current sensor, current through a first switch of a plurality of parallel-connected switches comprising at least the first switch and a second switch, (ii) sense, with a second current sensor, current through the second switch, (iii) modify operation of one or more of the switches in response to detecting at least one of the switches is failed, and (iv) detect that one of the first switch and the second switch is failed when the current through the first switch and the current through the second switch are unbalanced.

Item 16: In another embodiment, the present disclosure provides the non-transitory computer readable storage medium of Item 15, further comprising stored computer executable instructions to cause the controller to detect that the first switch is failed when the current through the first switch is less than the current through the second switch.

Item 17: In another embodiment, the present disclosure provides a method, the method comprising: sensing, by a first current sensor, current through a first switch of a plurality of parallel-connected switches comprising at least the first switch and a second switch; sensing, by a second current sensor, current through the second switch; modifying, by a controller in communication with the first and second current sensors, operation of one or more of the switches in response to detecting at least one of the switches is failed; and detecting, by the controller, that one of the first switch and the second switch is failed due to the current through the first switch and the current through the second switch being unbalanced.

Item 18: In another embodiment, the present disclosure provides the method of Item 17, further comprising detecting, by the controller, that the first switch is failed as the current through the first switch is less than the current through the second switch.

Item 19: In another embodiment, the present disclosure provides the method of any preceding Item, further comprising: sensing, by the first current sensor, current through a first set of switches comprising the first switch, the first set of switches being of the plurality of parallel-connected switches; sensing, by the second current sensor, current through a second set of switches comprising the second switch, the second set of switches being of the plurality of parallel-connected switches, the first set of switches and the second set of switches comprising a same number of switches; and detecting, by the controller, that one of the switches of the first set of switches or one of the switches of the second set of switches is failed as the current through the first set of switches and the current through the second set of switches are unbalanced.

Item 20: In another embodiment, the present disclosure provides the method of any preceding Item, further comprising: sensing, by the first current sensor, current through the first switch and a third switch of the plurality of parallel-connected switches further comprising the third switch and a fourth switch; sensing, by the second current sensor, current through the second switch and the fourth switch; and detecting, by the controller, that one of the first switch and the third switch or one of the second switch and the fourth switch is failed as the current through the first switch and the third switch and the current through the second switch and the fourth switch are unbalanced.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

What is claimed is:

1. A junction box, comprising:

a plurality of parallel-connected switches comprising at least a first switch and a second switch;

a first current sensor sensing current through the first switch;

a second current sensor sensing current through the second switch; and a controller in communication with the first and second current sensors, the controller adapted to modify the operation of the junction box in response to detecting at least one of the first switch and the second switch failed and wherein the controller is adapted to compare the current through the first switch with the current through the second switch and detect that one of the first switch and the second switch failed based on an imbalance between the current through the first switch and the current through the second switch.

2. The junction box of claim 1, wherein:

the controller detects that the first switch failed when the current through the first switch is less than the current through the second switch.

3. The junction box of claim 1, wherein:

the controller detects that the first switch and the second switch are in a proper order when the current through the first switch and the current through the second switch are balanced.

4. The junction box of claim 1, wherein:

the plurality of parallel-connected switches further comprise;

a third switch and a fourth switch;

the first current sensor sensing current through the first switch and the third switch;

the second current sensor sensing current through the second switch and the fourth switch; and the controller detects that one of the first switch and the third switch or one of the second switch and the fourth switch failed when the current through the first switch and the third switch and the current through the second switch and the fourth switch are unbalanced.

5. The junction box of claim 4, wherein:

the controller detects that one of the first switch and the third switch failed when the current through the first switch and the third switch is less than the current through the second switch and the fourth switch.

6. The junction box of claim 5, wherein:

the controller detects that the first switch failed when the current through the first switch and the third switch, while the first switch is controlled by the controller to be open, is greater than the current through the first switch and the third switch while the third switch is controlled by the controller to be open.

7. The junction box of claim 4, wherein:

the controller detects that the first switch, the second switch, the third switch, and the fourth switch are in a proper order when the current through the first switch and the third switch and the current through the second switch and the fourth switch are balanced.

8. The junction box of claim 1, wherein:

the plurality of parallel-connected switches comprise a first set of switches comprising the first switch and a second set of switches comprising the second switch, the first set of switches and the second set of switches comprising a same number of switches;

the first current sensor sensing current through the first set of switches;

the second current sensor sensing current through the second set of switches; and the controller detects that one of the switches of the first set of switches or one of the switches of the second set of switches failed when the current through the first set of switches and the current through the second set of switches are unbalanced.

9. The junction box of claim 8, wherein:

the controller detects that one of the switches of the first set of switches failed when the current through the first set of switches is less than the current through the second set of switches.

10. The junction box of claim 1, wherein:

the plurality of parallel-connected switches comprise a first set of switches comprising the first switch, a second set of switches comprising the second switch, and at least one or more set of switches, the first set of switches, the second set of switches, and each of the at least one or more set of switches comprising a same number of switches;

the first current sensor sensing current through the first set of switches;

the second current sensor sensing current through the second set of switches;

at least one or more current sensors sensing current through the at least one or more set of switches, respectively; and the controller detects that one of the switches of the first set of switches, one of the switches of the second set of switches, or one of the switches of the at least one or more set of switches failed when the current through the first set of switches, the current through the second set of switches, and the current through the at least one or more set of switches are unbalanced.

11. The junction box of claim 1, wherein:

the controller modifies operation of the junction box in response to detecting at least one of the switches failed by modifying operation of one or more of the switches.

12. The junction box of claim 1, wherein:

the controller generates a warning notification in response to detecting at least one of the switches failed.

13. The junction box of claim 1, wherein:

the plurality of parallel-connected switches are connected in parallel between a battery and a load.

14. The junction box of claim 1, wherein:

each of the current sensors comprises an amplifier and a shunt resistor.

15. A non-transitory computer readable storage medium comprising stored computer executable instructions to cause a controller to:

sense, with a first current sensor, current through a first switch of a plurality of parallel-connected switches comprising at least the first switch and a second switch;

sense, with a second current sensor, current through the second switch; and modify operation of one or more of the switches in response to detecting at least one of the switches failed, wherein the controller is adapted to compare the current through the first switch and the current through the second switch and detect that one of the first switch and the second switch failed based on an imbalance between the current through the first switch and the current through the second switch.

16. The non-transitory computer readable storage medium of claim 15, further comprising stored computer executable instructions to cause the controller to detect that the first switch failed when the current through the first switch is less than the current through the second switch.

17. A method, comprising:

sensing, by a first current sensor, current through a first switch of a plurality of parallel-connected switches comprising at least the first switch and a second switch;

sensing, by a second current sensor, current through the second switch; and modifying, by a controller in communication with the first and second current sensors, operation of one or more of the switches in response to detecting at least one of the switches failed, wherein the controller is adapted to compare the current through the first switch and the current through the second switch and detect that one of the first switch and the second switch failed based on an imbalance between the current through the first switch and the current through the second switch.

18. The method of claim 17, further comprising:

detecting, by the controller, that the first switch failed as the current through the first switch is less than the current through the second switch.

19. The method of claim 17, further comprising:

sensing, by the first current sensor, current through a first set of switches comprising the first switch, the first set of switches being of the plurality of parallel-connected switches;

sensing, by the second current sensor, current through a second set of switches comprising the second switch, the second set of switches being of the plurality of parallel-connected switches, the first set of switches and the second set of switches comprising a same number of switches; and detecting, by the controller, that one of the switches of the first set of switches or one of the switches of the second set of switches failed as the current through the first set of switches and the current through the second set of switches are unbalanced.

20. The method of claim 17, further comprising:

sensing, by the first current sensor, current through the first switch and a third switch of the plurality of parallel-connected switches further comprising the third switch and a fourth switch;

sensing, by the second current sensor, current through the second switch and the fourth switch; and detecting, by the controller, that one of the first switch and the third switch or one of the second switch and the fourth switch failed as the current through the first switch and the third switch and the current through the second switch and the fourth switch are unbalanced.

* * * * *